United States Patent

[11] 3,557,831

| [72] | Inventor | Jay R. Katchka |
| | | Long Beach, Calif. |
| [21] | Appl. No. | 697,412 |
| [22] | Filed | Jan. 12, 1968 |
| [45] | Patented | Jan. 26, 1971 |
| [73] | Assignee | Robertshaw Controls Company |
| | | Richmond, Va. |
| | | a corporation of Delaware |

[54] PRESSURE REGULATING APPARATUS WITH BALANCING MEANS
15 Claims, 7 Drawing Figs.

[52] U.S. Cl............................................... 137/613,
137/505.18, 137/510, 137/495
[51] Int. Cl.............................................. F23n 1/00
[50] Field of Search......................................... 137/495,
613, 510, 505.14, 505.15, 505.18; 431/89, 38;
236/92A, 80; 198/115

[56] References Cited
UNITED STATES PATENTS

| 2,388,868 | 11/1945 | Ray | 137/495 |
| 2,833,304 | 5/1958 | Fish | 137/505.15X |
| 3,053,315 | 9/1962 | Deady | 137/510 |
| 3,118,494 | 1/1964 | Yost | 431/89X |
| 3,189,043 | 6/1965 | Stadler | 137/505.18X |
| 3,211,373 | 10/1965 | Miller | 236/80X |
| 3,377,024 | 4/1968 | Nutten | 431/89X |
| 3,386,467 | 6/1968 | Katchka | 236/92(A) |

*Primary Examiner*—Harold W. Weakley
*Attorneys*—Auzville Jackson, Jr., Robert L. Marben and Christen, Sabol & O'Brien

ABSTRACT: A flow control system including a normally closed balanced pressure regulator located downstream from an automatic control device and wherein the normally closed balanced pressure regulator includes a valve, a closure spring which maintains the valve in a normally closed position, an actuating diaphragm which senses inlet pressure when the automatic control device is open to overcome the force of the closure spring and slowly open the valve, a regulating diaphragm for regulating outlet pressure, and a balancing diaphragm or a self-balancing vane.

PATENTED JAN 26 1971

INVENTOR.
JAY R. KATCHKA
BY
Christen, Sabol, O'Brien & Caldwell
ATTORNEYS

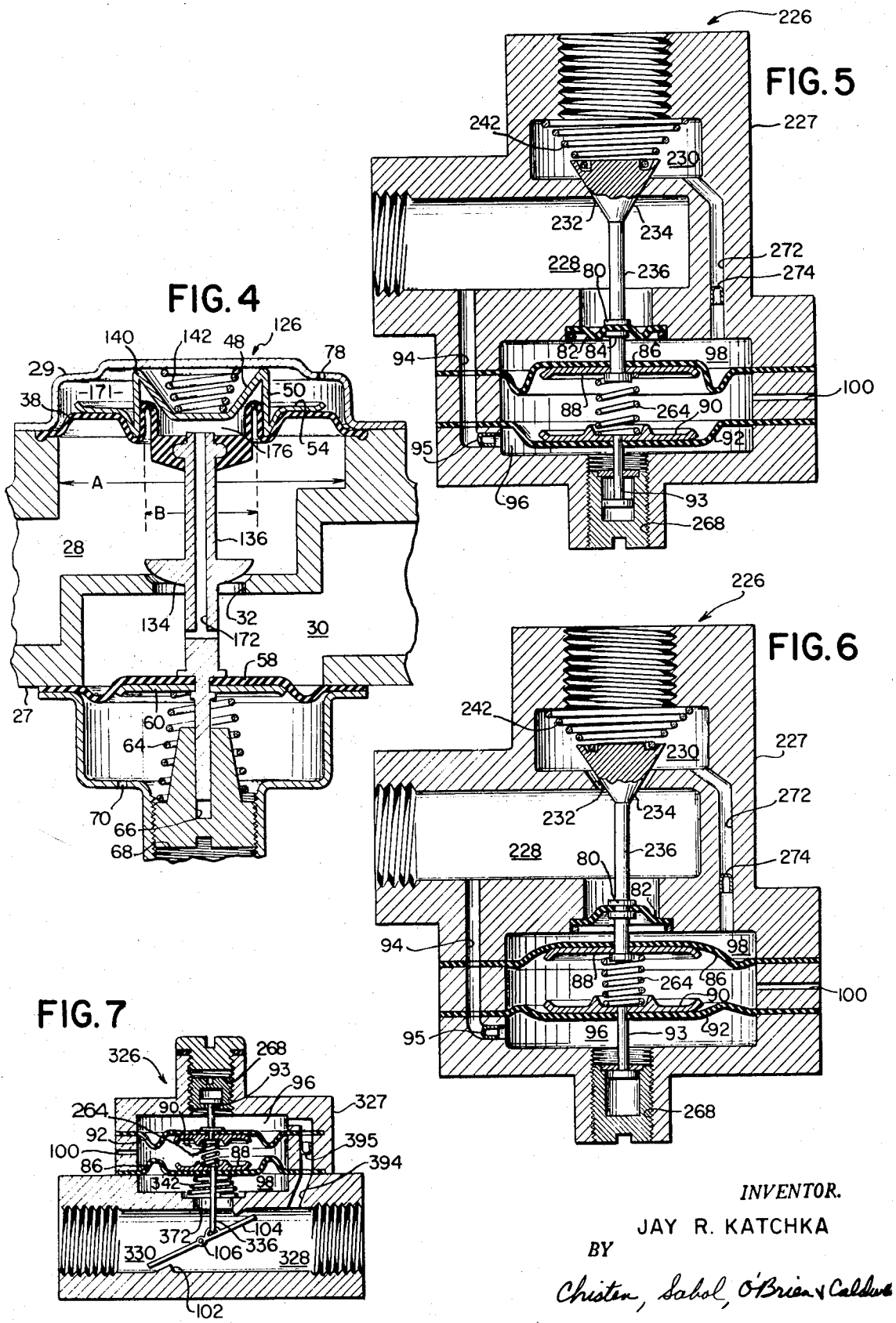

PRESSURE REGULATING APPARATUS WITH BALANCING MEANS

BACKGROUND OF THE INVENTION

The present invention pertains to pressure regulators, and more particularly, to normally closed pressure regulators for use in a location downstream from a control device in a burner control system.

Modern fuel burning appliances have specific pressure requirements, and in order to operate them at maximum efficiency it has been the practice to utilize a pressure regulator to apply a constant flow pressure to the burner apparatus. Ordinarily an automatic or thermostatic control device is employed to provide on-off control of fuel for such appliances.

In the past when it was desired to use a pressure regulator with an automatic control device, the pressure regulator was located upstream of the control device. This location is desirable because closure of the control device creates a back pressure which is applied to the pressure regulator to close it. Consequently, when the downstream control device is opened, the pressure which is applied to the pressure regulator to close it. Consequently, when the downstream control device is opened, the pressure regulator opens gradually and softly ignites the burner. The upstream location of the pressure regulator has a disadvantage in that the pressure of the flow to the burner apparatus is apt to vary due to the distance between the pressure regulator and the burner apparatus and the connections and devices therebetween, such as the control device. Another disadvantage of the upstream location is the inconvenience from an assembly and repair standpoint.

The use of a conventional pressure regulator in a downstream location from the control device has a disadvantage in that when the control device is closed, the lack of inlet pressure on the pressure regulator renders it in a normally open position. Consequently, when the control device is opened, the wide open position of the pressure regulator initially permits an excessive flow of fuel to the burner apparatus which is accordingly subject to spillage of the products of combustion or "roll out" and to noisy ignition.

SUMMARY OF THE INVENTION

An advantage of the present invention is that the pressure of flow to burner apparatus may be accurately controlled by a pressure regulator by reducing the losses between the pressure regulator and the burner without sacrificing soft ignition and without "roll out" or noise. Another advantage of the present invention is that the pressure regulator is located in a position that is convenient for assembly and repair.

An object of the present invention is to employ a normally closed pressure regulator downstream from a control device in a burner control system.

Another object of the present invention is to construct a pressure regulator which is normally closed when there is no inlet pressure.

Another object of the present invention is to utilize a closure spring to maintain a pressure regulator normally closed when there is no inlet pressure.

The present invention has another object in that a diaphragm is used to open a normally closed pressure regulator when the diaphragm senses inlet pressure.

Another object of the present invention is to open and balance a normally closed pressure regulator by using a single diaphragm to perform both functions.

A further object of the present invention is to construct a normally closed pressure regulator utilizing a butterfly valve.

The present invention is generally characterized in that a burner control system includes a control device, burner apparatus and a normally closed pressure regulator interposed downstream of the control device and upstream of the burner apparatus. The normally closed pressure regulator includes a valve for controlling the valve and means for biasing the valve to a normally closed position and opening the valve in response to inlet pressure of the regulator. In addition, the normally closed pressure regulator may include balancing means, and a single diaphragm may act to open the valve and as balancing means.

Other objects and advantages of the present invention will become apparent from the following description of the preferred embodiments as shown in the accompanying drawings.

BRIEF DESCRIPTION OF THE DRAWINGS

FIG. 4 is a schematic diagram of a second embodiment of the present invention in its operating position;

FIG. 5 is a schematic diagram of a third embodiment of the present invention in its normally closed position;

FIG. 6 is a schematic diagram of the third embodiment depicted in FIG. 5 in its operating position; and FIG. 7 is a schematic diagram of a fourth embodiment of the present invention in its operating position.

DESCRIPTION OF THE PREFERRED EMBODIMENTS

Figure 1:
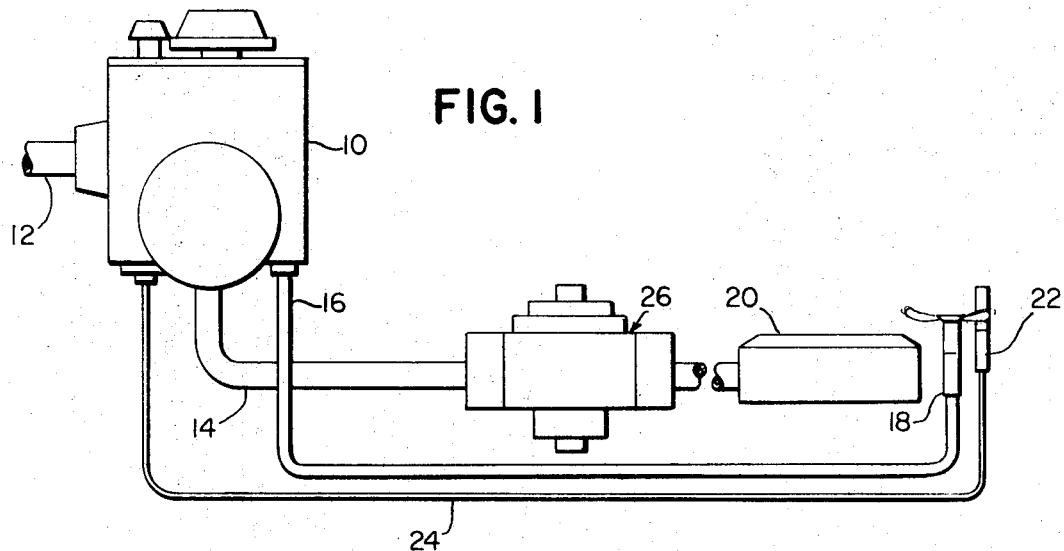
FIG. 1 is a schematic diagram of a burner control system according to the present invention.

As is illustrated in FIG. 1, the present invention is embodied in a burner control system wherein burner apparatus is cyclically controlled to maintain a desired condition, such as the temperature control systems utilized in heating and/or cooling systems, water heaters, space heaters, etc. For ease of description the present invention will be described with respect to a thermostatically cycled system but the present invention is not intended to be limited to such systems.

The burner control system illustrated in FIG. 1 includes a thermostatic control device 10 having an inlet conduit 12, an outlet communicating with main conduit 14 and an outlet communicating with pilot conduit 16. Inlet conduit 12 is adapted to be connected to a gas supply (not shown). Pilot conduit 16 leads to a pilot burner 18 which is disposed in igniting proximity to a main burner 20. A thermocouple 22 is disposed adjacent pilot burner 18 and is connected to thermostatic control device 10 through a cable 24. The main conduit 14 communicates with the main burner 20 through a pressure regulator 26.

The thermostatic control device 10 may be of conventional design and does not constitute part of the present invention. For the purposes of the present invention, the thermostatic control device 10 need only be capable of on-off control of a gas supply. Reference may be had to U.S. Pat. Nos. 2,953,937 and 2,989,841 for a more complete description of the function and structure of conventional control devices.

The thermocouple 22 is part of a conventional flame proving system and operates to generate electricity when it is exposed to the heat of the flame at pilot burner 18. The electricity generated by thermocouple 22 acts to hold a safety valve open in thermostatic control device 10. Should the flame at pilot burner 18 fail or be extinguished, the safety valve will close thereby preventing further gas flow through thermostatic control device 10.

The pressure regulator 26 is normally closed and will open when the main valve in thermostatic control device 10 opens. The opening of pressure regulator 26 to its full regulating position is delayed and gradual so as not to allow an initial surge of gas to swamp main burner 20 thereby establishing soft ignition.

When the main valve in thermostatic control device 10 is closed there is no gas flow through conduit 14 to main burner 20 and pressure regulator 26 is closed. When there is a demand for gas due to a temperature condition communicated to thermostatic control device 10, the main valve in thermostatic control device 10 will open which allows gas to be delivered to conduit 14. Flow of gas through pilot conduit 16 is continuous as long as thermocouple 22 senses a flame at pilot burner 18. Since pressure regulator 26 is normally closed and opens gradually only a small amount of gas is initially supplied to main burner 20, and hence the ignition of main burner 20 will be soft. When the demand for gas has been satisfied, the main valve in thermostatic control device 10 will close and pressure regulator 26 will revert to its normally closed state.

The pressure regulator, generally indicated at 26, includes a lower casing 27 and an upper casing 29 being formed to have an inlet chamber 28 connected to the thermostatic control device 10 through main conduit 14 and an outlet chamber 30 which is connected to main burner 20. A regulating valve is interposed between inlet chamber 28 and outlet chamber 30 and includes a valve seat 32 and a valve member 34 secured to a valve stem 36.

Valve stem 36 extends upward through a flexible actuating diaphragm 38, a diaphragm pan 40 and a closure spring 42 and into a valve guide slot 44 in an adjustment screw 46. Actuating diaphragm 38 is secured at its periphery between lower casing 27 and upper casing 29 and is secured at its center to valve stem 36 by molding a ring into a thickened central portion of the actuating diaphragm 38. Diaphragm pan 40 is cup-shaped and has a depressed center region 48 abutting the top of actuating diaphragm 38 and having an opening through which valve stem 36 extends, an upstanding wall 50 having an opening 52 therein, and an annular peripheral flange 54 which is fastened to actuating diaphragm 38 by adhesive or mechanical means. The closure spring 42 is mounted in compression between the depressed center region of diaphragm pan 40 and the bottom of adjustment screw 46.

Valve stem 36 extends downward through a ring 56, a flexible regulating diaphragm 58, a diaphragm pan 60, a ring 62 and a regulator spring 64 and into a valve guide slot 66 in an adjustment screw 68. The regulating diaphragm 58 is secured to the sidewalls of lower casing 27 at its periphery and is reinforced by by diaphragm pan 60 which is mounted on its underside. Regulator spring 64 is mounted in compression between adjustment screw 68 and diaphragm pan 60. A passage 70 vents the chamber defined by lower casing 27 and diaphragm 58 to the atmosphere.

The outlet chamber 30 communicates with a chamber 71 defined by diaphragm 38 and upper casing 29 through a passage 72 having a restrictor 74 therein. By means of the opening 52, the chamber 71 communicates with a chamber 76 defined by diaphragm 38, the upstanding wall 50 of diaphragm pan 40, and the top of diaphragm pan 40.

The operation of pressure regulator 26 will be described with respect to FIG. 2 which shows pressure regulator 26 in its normally closed position and FIG. 3 which shows pressure regulator 26 in its operating position. When the main valve in thermostatic control device 10 is closed, all the gas passages in pressure regulator 26 are subject to atmospheric pressure. There will be no pressure differential across either actuating diaphragm 38 or regulating diaphragm 58 since both surfaces of diaphragm 38 and diaphragm 58 will experience atmospheric pressure, and consequently, closure spring 42 will tend to force valve stem 36 down while regulator spring 64 will tend to force valve stem 36 up. Closure spring 42 is stronger than regulator spring 64, and therefore valve stem 36 will be forced down which causes valve member 34 to sealably engage valve seat 32 thereby rendering pressure regulator 26 in its normally closed position.

Figure 2:
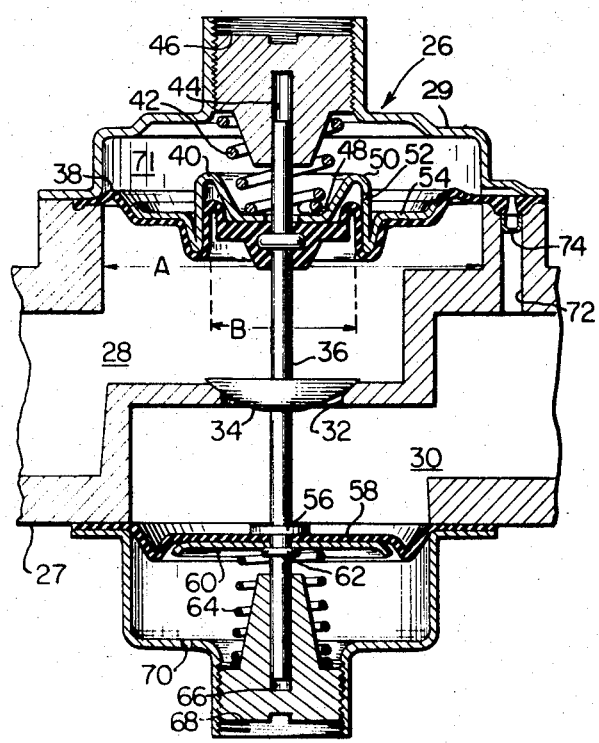
FIG. 2 is a schematic diagram of a first embodiment of the present invention in its normally closed position.
Figure 3:
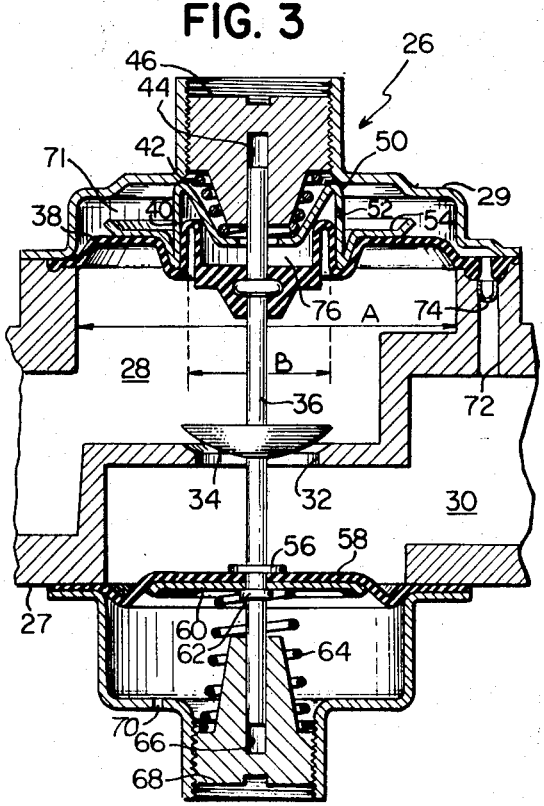
FIG. 3 is a schematic diagram of the first embodiment depicted in FIG. 2 in its operating position.

When the main valve in thermostatic control device 10 is opened inlet pressure will act on the total area of actuating diaphragm 38, which area is designated A in FIGS. 2 and 3. The area designated B in FIGS. 2 and 3 is the area of actuating diaphragm 38 which is directly under the depressed center region 48 of diaphragm pan 40. The inlet pressure on the lower surface of that part of area A which is exclusive of area B provides a pressure differential across diaphragm 38 which is sufficient to cause diaphragm 38 to deflect upward and force diaphragm pan 40 to seat against upper casing 29 as shown in FIG. 3. The inlet pressure, acting as described above, neutralized the force of closure spring 42 and allows regulator spring 64 to move valve stem 36 upward to disengage valve member 34 from valve seat 32. Valve member 34 will continue to move away from valve seat 32 until it assumes its full regulating position. The opening of the regulating valve is gradual due to the size of atmospheric vent 70 and the restrictor 74 in passage 72. If slower response is desired either or both of the openings of atmospheric vent 70 and restrictor 74 may be reduced, and if faster response is desired the openings may be increased or restrictor 74 may be removed.

With the regulating valve open, inlet chamber 28 communicates with outlet chamber 30. Passage 72 senses the pressure in outlet chamber 30 and communicates it to chambers 71 and 76. The area B of diaphragm 38 acts independently of area A as a balancing diaphragm since closure spring 42 is neutralized by the force on area A exclusive of area B and diaphragm pan 40 is held against upper casing 27.

Regulating diaphragm 58 experiences outlet pressure on its upper surface and atmospheric pressure coupled with the force of regulator spring 64 on its lower surface, and diaphragm 58 will deflect in accordance with the pressure differential across it thereby regulating outlet pressure by varying the position of valve member 34 with respect to varying outlet pressure. The balancing diaphragm defined by area B serves to provide an opposing force approximately equal to the differential pressure force across the regulating valve to make regulator 26 more directly responsive to diaphragm 58.

Upon closure of the main valve in thermostatic control device 10, the reduction of pressure in inlet chamber 28 removes the force on the underside of diaphragm 38, and closure spring 42 overcomes regulator spring 64 and forces valve stem 36 down to cause valve member 34 to sealably engage valve seat 32 to render pressure regulator 26 in its normally closed position.

By varying spring forces and diaphragm areas, pressure regulator 26 can be modified to be responsive to various inlet pressures for proper opening and various inlet-to-outlet pressure differentials in its operating state. The adjustment screw 46 for closure spring 42 enables the pressure regulator 26 to be easily balanced for relative closure spring and regulator spring forces. Adjustment screw 46 also compensates for valve stem and other weight factors; however, adjustment screw 46 is not essential or necessary when proper spring and weight tolerances are maintained. The valve guides 44 and 66, while not essential to the invention, enable the pressure regulator 26 to be more suitable for multipoise applications.

In the following description of the remaining FIGS. of the drawings, identical reference numerals are used for identical parts already described above, reference numerals with 100 added are used for similar parts in FIG. 4, reference numerals with 200 added are used for similar parts in FIGS. 5 and 6, reference numerals with 300 added are used for similar parts in FIG. 7 and new reference numerals are used for new parts.

The embodiment of the present invention illustrated in FIG. 4 is a modification of the embodiment of FIGS. 2 and 3. A pressure regulator, generally indicated at 126, includes an inlet chamber 28 and an outlet chamber 30 separated by a regulating valve which includes a valve seat 32 and a valve member 134 that is secured to a valve stem 136. Valve stem 136 is attached to an actuating diaphragm 38 by molding a ring into the thickened central portion of diaphragm 38.

A diaphragm pan 140 is similar in shape to that illustrated in FIGS. 2 and 3 and is attached to actuating diaphragm 38 at its annular peripheral flange 54 to provide a gastight seal. The depressed center region 48 of diaphragm pan 140 forms a seat for closure spring 142 which abuts upper casing 29 at its other end. The regulating portion of pressure regulator 126 is identical in structure and operation to the regulating portion of the embodiment of FIGS. 2 and 3.

A passage 172 extends axially through valve stem 136 and communicates with outlet chamber 30 at its lower end and a chamber 176 at its upper end. Chamber 176 is defined by the walls and top of diaphragm pan 140 and the center region of diaphragm 38.

An opening 78 in upper casing 29 provides an atmospheric vent for chamber 171 which is defined by upper casing 29 and diaphragm 38. As is apparent, the embodiment of FIG. 4 differs from the embodiment of FIGS. 2 and 3 in that in FIG. 4 the pressure sensed in outlet chamber 30 is communicated through passage 172 in valve stem 136 to chamber 176 which does not communicate with chamber 171; whereas in FIGS. 2 and 3, passage 72 communicates the pressure in outlet chamber 30 to both chambers 71 and 76.

The operation of pressure regulator 126 is essentially the same as the operation of pressure regulator 26, as previously described. When the main valve in thermostatic control device 10 is closed all passages are subjected to atmospheric pressure. Consequently, there is no pressure differential across either actuating diaphragm 38 or regulating diaphragm 58, and closure spring 142 overcomes regulator spring 64 to force valve stem 136 down to sealably engage valve member 134 and valve seat 32. Hence, pressure regulator 126 is in its normally closed position when the main valve in thermostatic control device 10 is closed.

Upon the opening of the main valve in thermostatic control device 10, the pressure in inlet chamber 28 causes an inlet-to-atmospheric pressure differential across diaphragm 38 which causes it to deflect upward and force diaphragm pan 140 against upper casing 29. This action neutralizes closure spring 142 and allows regulator spring 64 to force valve stem 136 up to open the regulating valve by moving valve member 134 away from valve seat 32. The opening of the regulating valve is slow due to the restriction of atmospheric vents 70 and 78. When the regulating valve assumes its full regulating position area B acts as a balancing diaphragm since chamber 176 will be at outlet pressure. The force available to cancel the force of spring 142 and keep diaphragm pan 140 pressed against upper casing 29 is greater than that available in the embodiment of FIGS. 2 and 3 because the pressure differential across actuating diaphragm 38 is inlet pressure to atmospheric pressure in FIG. 4; whereas in FIGS. 2 and 3 the pressure differential across actuating diaphragm 38 is inlet pressure to outlet pressure. The embodiment of FIG. 4 thus has an advantage over the embodiment of FIGS. 2 and 3 in that the closure spring force and actuating diaphragm area are less critical.

A further embodiment of a pressure regulator according to the present invention is shown in its closed position in FIG. 5 and in its operating position in FIG. 6. The pressure regulator, indicated generally at 226, includes a casing 227 having an inlet chamber 228 and an outlet chamber 230. Interposed between inlet chamber 228 and outlet chamber 230 is a regulating valve having a valve seat 232 and a valve member 234 secured to the upper end of a valve stem 236. The lower end of the valve stem 236 extends through a ring 80, a balancing diaphragm 82, a ring 84, a regulating diaphragm 86 and a diaphragm pan 88. Balancing diaphragm 82 is attached to valve stem 236 by rings 80 and 84 and is attached at its periphery to the sidewalls of casing 227. Diaphragm pan 88 is secured to the bottom surface of regulating diaphragm 86, and a regulator spring 264 is mounted between diaphragm pan 88 and a diaphragm pan 90 which is secured to an actuating diaphragm 92. Diaphragm pan 90 is attached to a rod 93 which extends into and seats in the cavity of a regulator adjustment screw 268. A passage 94 having a restrictor 95 therein leads from inlet chamber 228 to a chamber 96 defined by actuating diaphragm 92 and the bottom wall of casing 227. A passage 272 having a restrictor 274 therein leads from outlet chamber 230 to a chamber 98 defined by balancing diaphragm 82, regulating diaphragm 86 and the walls of casing 227. A passage 100 vents the chamber between regulating diaphragm 86 and actuating diaphragm 92 to the atmosphere.

A closure spring 242 is mounted in compression between the upper wall of casing 227 and the top of valve member 234 which is formed with a seat for closure spring 242.

In operation pressure regulator 226 is closed when the main valve in thermostatic control device 10 is closed, as depicted in FIG. 5, because all the passages therein are at atmospheric pressure. Since there is no pressure differential across any of diaphragms 82, 86 and 92 closure spring 242 forces valve member 234 down to sealably engage valve seat 232 to render pressure regulator 226 in its normally closed position.

The pressure regulator 226 assumes its operating position as shown in FIG. 6 when the main valve in thermostatic control device 10 is opened. When thermostatic control device 10 is opened, inlet chamber 228 senses inlet pressure, and passage 94 communicates inlet pressure to chamber 96 which places an inlet-to-atmospheric pressure differential across actuating diaphragm 92 which causes it to deflect upward, limited by the seating of rod 93 in the cavity of adjustment screw 268. This upward deflection overcomes the force of closure spring 242 to allow regulator spring 264 to force valve member 234 away from valve seat 232 until the regulating valve reaches its full regulating position. The regulating valve opens slowly due to restrictors 95 and 274 to allow soft ignition.

The pressure in outlet chamber 230 is communicated to chamber 98 by passage 272. Thus, regulating diaphragm 86 has outlet pressure on its upper surface and atmospheric pressure coupled with the force of regulator spring 264 on its lower surface, and diaphragm 86 deflects in accordance with the pressure differential across it to regulate the position of valve member 234 and the outlet pressure. Diaphragm 82 will have the difference in inlet and outlet pressure across it and acts as a balancing diaphragm.

When the main valve in thermostatic control device 10 is closed, the reduction in inlet pressure allows closure spring 242 to force valve member 234 down to sealably engage valve seat 232 to render the pressure regulator 226 in its normally closed condition.

The openings of restrictors 95 and 274 may be decreased if slower regulating valve response is desired, or the openings may be increased or the restrictors may be removed altogether if faster response is desired.

Another embodiment of a pressure regulator according to the present invention is illustrated in FIG. 7. The upper portion of the pressure regulator, generally indicated at 326, is similar to the lower portion of pressure regulator 226, and those parts which are identical are given identical reference numerals and no further explanation. Pressure regulator 326 includes a casing 327 having an inlet chamber 328 and an outlet chamber 330, and a butterfly valve is disposed therebetween. The butterfly valve includes an angularly oriented annular valve seat 102 and a vane 104 pivotally connected to a pin 106. The upper surface of vane 104 includes a ring which is attached to a valve stem 336. Valve stem 336 extends through a passage 372, closure spring 342 and a regulating diaphragm 86 to diaphragm pan 88 where its upper end is firmly secured. A regulator spring 264 is mounted between the diaphragm pan 88 and a diaphragm pan 90. Diaphragm pan 90 is firmly secured to a rod 93 which extends through an actuating diaphragm 92, to which diaphragm pan 90 is attached, and into a cavity of an adjustment screw 268. A passage 394, having a restrictor 395 therein, leads from inlet passage 328 to chamber 96 which is defined by the upper and side walls of casing 327 and actuating diaphragm 92. A passage 100 acts as an atmospheric vent for a chamber defined by actuating diaphragm 92 and regulating diaphragm 86. Passage 372 communicates with outlet chamber 330 and a chamber 98 which is defined by the walls of casing 327 and regulating diaphragm 86.

In operation pressure regulator 326 is in its normally closed position when the main valve in thermostatic control device 10 is closed. The closure of the main valve in thermostatic control device 10 causes all the passages of pressure regulator 326 to be subjected to atmospheric pressure. Since there will be no pressure differential across either actuating diaphragm 92 or regulating diaphragm 86, closure spring 342 forces valve stem 336 up to cause vane 104 to sealably engage valve seat 102 which renders pressure regulator 326 in its normally closed position.

When the main valve in thermostatic control device 10 opens, inlet pressure will be applied to inlet chamber 328 and, through passage 394 to chamber 96. Actuating diaphragm 92 now has inlet pressure on its upper surface and atmospheric pressure on its lower surface and the pressure differential across actuating diaphragm 92 causes it to deflect downward limited by the seating of rod 93 in the cavity of adjustment screw 268. This downward deflection overcomes the force of closure spring 342 and allows valve stem 336 to be forced down to open the butterfly valve. With the force of closure spring 342 overcome, regulator spring 264 controls the butterfly valve. Vane 104 will open slowly due to the restrictor 395 in passage 394, and if faster response is desired the opening of restrictor 395 may be enlarged or restrictor 395 may be removed altogether. Similarly, if slower response is desired, the opening in restrictor 395 may be reduced.

When pressure regulator 326 is in its operating position, the outlet pressure in outlet chamber 330 is communicated to chamber 98 through passage 372. The differential of outlet pressure and atmospheric pressure acting on regulating diaphragm 86 coupled with the downward force of regulator spring 264 permits valve stem 336 to control valve 104 and regulate outlet pressure.

A balancing diaphragm is not necessary in this embodiment because the center-hinged vane 104 of the butterfly valve inherently acts as a balancer due to outlet and inlet pressures being applied to opposite surfaces of vane 104.

When the main valve in thermostatic control device 10 is closed, pressure regulator 326 reverts to its normally closed position since inlet pressure is removed from chamber 96 which allows closure spring 342 to force valve stem 336 upward to close the butterfly valve.

The preferred embodiments of pressure regulators in accordance with the present invention, as shown in FIGS. 2, 3, 4, 5, 6 and 7, may each be used effectively in the system of the present invention as shown in FIG. 1. As disclosed above, each of the pressure regulator embodiments is normally closed and allows soft ignition at the main burner 20 because each embodiment starts from a closed position and opens slowly. Furthermore, each of the above preferred embodiments may be used upstream of the thermostatic control device since back pressure caused by any closure downstream will cause the pressure regulators to close.

Inasmuch as the present invention is subject to many other modifications, variations and changes in details, it is intended that all matter contained in the foregoing description or shown in the accompanying drawings shall be interpreted as illustrative and not in a limiting sense.

I claim:

1. In a normally closed pressure regulator, the combination comprising:
   a casing having inlet means and outlet means;
   single valve means interposed between said inlet means and said outlet means for controlling a flow therethrough;
   said single valve means including a single fixed valve seat and a single valve element movable relative to said valve seat;
   regulating means operatively associated with said valve element and said outlet means so as to control said valve element in response to pressure of the flow in said outlet means; and
   actuating means including biasing means for maintaining said valve element in a normally closed position on said valve seat and a single diaphragm having one side responsive to pressure of the flow in said inlet means and being operatively associated with said biasing means such that in response to pressure of flow in said inlet said diaphragm will overcome said biasing means to permit opening of said single valve element relative to said valve seat under control of said regulating means, and said diaphragm having a portion of said one side equal in area to said valve element and operatively connected thereto to balance said valve element and operatively connected thereto to balance said valve element when in an open position.

2. The combination as recited in claim 1 wherein said actuating means further includes a diaphragm pan having a peripheral flange attached to said diaphragm, and means for limiting movement of said diaphragm pan in response to pressure of the flow in said inlet means.

3. The combination as recited in claim 2 wherein said casing includes an adjustable screw and said biasing means includes a spring mounted between said adjustable screw and said diaphragm pan.

4. The combination as recited in claim 2 wherein said biasing means includes a spring mounted between a wall of said casing and said diaphragm pan.

5. The combination as recited in claim 1 wherein said actuating means further includes a diaphragm pan secured to said diaphragm and a rod secured to said diaphragm pan to limit movement of said diaphragm means.

6. The combination as recited in claim 5 wherein said biasing means includes a spring mounted between a wall of said casing and said valve means.

7. The combination as recited in claim 5 wherein said biasing means includes a spring mounted between a wall of said casing and said regulating means.

8. In a normally closed pressure regulator, the combination comprising:
   a casing having inlet means and outlet means;
   valve means interposed between said inlet means and said outlet means for controlling a flow therethrough;
   regulating means operatively connected to said valve means and responsive to pressure of the flow in said outlet means to control said valve means;
   actuating means including biasing means operatively connected to said valve means to maintain said valve means in a normally closed position and actuating diaphragm means responsive to pressure of the flow in said inlet means and operatively associated with said biasing means whereby said actuating diaphragm means will overcome said biasing means to allow said valve means to open in response to pressure of the flow in said inlet means; and
   a portion of said actuating diaphragm means being operatively connected to said valve means and operating as a balancing diaphragm.

9. The combination as recited in claim wherein said balancing diaphragm has a pair of surfaces, one surface being responsive to pressure of the flow in said inlet means and the other surface being responsive to pressure of the flow in said outlet means.

10. In a normally closed pressure regulator, the combination comprising:
    a casing having inlet means and outlet means;
    valve means interposed between said inlet means and said outlet means for controlling a flow therethrough;
    regulating means operatively connected to said valve means and responsive to pressure of the flow in said outlet means to control said valve means;
    actuating means including biasing means operatively connected to said valve means to maintain said valve means in a normally closed position and actuating diaphragm means responsive to pressure of the flow in said inlet means and operatively associated with said biasing means whereby said actuating diaphragm means will overcome said biasing means to allow said valve means to open in response to pressure of the flow in said inlet means; and
    said valve means including a vane pivotally mounted on a pin so as to act as a butterfly valve whereby said vane operates as a balancing means.

11. In a normally closed pressure regulator, the combination comprising:
    a casing having an inlet and an outlet;
    valve means disposed between said inlet and said outlet for controlling a flow therethrough;

regulating means connected with said valve means and responsive to the flow at said outlet to control said valve means;

biasing means connected with said valve means to maintain said valve means in a normally closed position;

pressure responsive means for overcoming said biasing means to allow said valve means to open in response to pressure at said inlet; and said pressure responsive means including a single diaphragm for overcoming said biasing means and balancing said valve means.

12. In a normally closed pressure regulator, the combination comprising:

a casing having an inlet and an outlet;

valve means disposed between said inlet and said outlet for controlling a flow therethrough;

regulating means connected with said valve means and responsive to the flow at said outlet to control said valve means;

biasing means connected with said valve means to maintain said valve means in a normally closed position;

pressure responsive means including a diaphragm movable in response to pressure at said inlet and attached to said casing to form a first chamber, a diaphragm pan covering a portion of said diaphragm and attached at its periphery to said diaphragm to form a second chamber, means for limiting movement of said diaphragm pan, and means communicating pressure at said outlet to said first and second chambers; and said biasing means including a spring mounted on said diaphragm whereby one portion of said diaphragm overcomes said biasing means and a second portion balances said valve means.

13. In a normally closed pressure regulator, the combination comprising:

a casing having an inlet and an outlet;

valve means disposed between said inlet and said outlet for controlling a flow therethrough;

regulating means connected with said valve means and responsive to the flow at said outlet to control said valve means;

biasing means connected with said valve means to maintain said valve means in a normally closed position; and pressure responsive means including:

a diaphragm movable in response to pressure at said inlet, a diaphragm pan covering a portion of said diaphragm and attached at its periphery to said diaphragm to form a chamber, means for limiting movement of said diaphragm pan, and means communicating pressure at said outlet to said chamber whereby one portion of said diaphragm overcomes said biasing means and a second portion balances said valve means.

14. The invention as recited in claim 13 wherein said valve means includes a valve stem having an axial passage and being affixed to the portion of said diaphragm under said diaphragm pan, and wherein said means communicating pressure at said outlet to said chamber includes said axial passage of said valve stem.

15. In a burner control system, the combination comprising:

a control device having inlet and outlet means and adapted for on-off control of a fuel flow between said inlet and outlet means;

said inlet means being adapted for connection to a source of fuel;

burner apparatus downstream of said outlet means for receiving a flow of fuel;

pressure regulator means interposed downstream of said control device and upstream of said burner apparatus to supply said burner apparatus with a flow of fuel at a predetermined pressure; and said pressure regulator means including a single fixed valve seat, a single valve element movable relative to said valve seat, pressure responsive means associated with said valve element to control said valve element in response to outlet pressure, a biasing means normally biasing said valve element to a closed position on said valve seat, a single diaphragm having one side responsive to inlet pressure and a portion of said one side operatively associated with said biasing means such that upon the presence of inlet pressure brought about by movement of said control device from a flow preventing position to a flow permitting position under the control of said pressure responsive means, and said diaphragm having another portion of said one side equal in area to said valve element and operatively connected thereto to balance said valve element when in an open position.